United States Patent Office 3,813,377
Patented May 28, 1974

3,813,377
OXIDATIVE DEHYDROCYCLIZATION PROCESS OF IMINES
Marcello Massi Mauri, San Donato Milanese, and Pietro Antonio Moggi, and Ugo Romano, Milan, Italy, assignors to Snam Progetti, S.p.A., Milan, Italy
No Drawing. Filed Nov. 2, 1971, Ser. No. 195,043
Claims priority, application Italy, Nov. 3, 1970, 31,304/70
Int. Cl. C07d 27/64
U.S. Cl. 260—279 R                                 7 Claims

ABSTRACT OF THE DISCLOSURE

The present invention provides a novel oxidative dehydrocyclization process wherein imines such as N-ethylidenecylohexylamine are used to prepare indole by a reaction in the presence of oxygen and a catalyst such as silica.

---

The present invention relates to an oxidative dehydrocyclization process of imines which gives rise, through a ring closure, to heterocyclic compounds having a nitrogen atom in their heterocyclic ring. More particularly, the present invention relates to a process of oxidative catalytic dehydrocyclization of imines to yield heterocyclic compounds which are derivatives of pyrrole and pyridine.

Many nitrogen containing heterocyclic compounds have been synthesized but the methods for obtaining them require expensive starting materials and difficult processes which often give rise to low yields of the final product. Recently, dehydrocyclization processes have been proposed starting from amines, ketones and aromatic or cycloaliphatic aldehydes, the reaction being carried out in presence of a chromium and copper based catalyst, at temperatures of 500–600° C. However, these processes give low yields of the final heterocyclic compound, and the catalyst is made inactive after a very short time, owing to the formation of carbon deposits, which requires frequent regenerations.

It is also known that pyridine may be obtained from N-ethylidenepropylamine and N-propylidenethylamine by means of a dehydrocyclization in the presence of iodine acting as hydrogen acceptor. Also, British Pat. No. 1,184,242 refers to a dehydrocyclization process of imines or amines carried out in the vapor phase in the presence of iodine to yield indole and quinoline derivatives. However, using iodine as hydrogen acceptor produces very great problems with respect to the choice of the plant materials and requires the employment of a method for recoving iodine for economic reasons.

It has now been found, and it is a feature of the present invention, that it is possible to obtain high yields of heterocyclic compounds which are derivatives of pyridine and pyrrole by dehydrocyclization of the corresponding imines in the presence of molecular oxygen or of a gas containing oxygen. The oxidative dehydrocyclization reaction may be carried out on several imines, which may be exemplified by the formula:

$$A-N=B$$

wherein N is nitrogen, A may be an alkyl, cycloalkyl or an aryl radical, the alkyl or cycloalkyl ones being also partially unsaturated; B may be an alkylidene, cycloalkylidene, alkylidenecycloalkyl or alkylidenearyl radical, with the provision that at least one of the mentioned radicals, A or B, is a cyclic radical.

Unrestrictive examples of the inventive process are: the preparation of indole from N-ethylidenecyclohexylamine and N-cyclohexylidenethylamine; 2-methylindole from N-cyclohexylideneisopropylamine and N-isopropylidenecyclohexylamine; carbazole from N-cyclohexylidenecyclohexylamine; phenanthridine from N-benzalcyclohexylamine; quinoline from N-cyclohexylidenepropylamine and from N-propylidenecyclohexylamine; acridine from N-cyclohexyliden-o-toluidine and the like.

According to the inventive process, an imine is reacted with molecular oxygen or a gas containing oxygen at high temperature, the gas preferably employed being air. The reaction may be carried out in the presence of an inert diluent such as nitrogen, argon, carbon dioxide, steam, benzene and saturated hydrocarbons which are stable under the reaction conditions. The molar ratio between oxygen and imine during feeding depends on the reacted imine structure, however it ranges from 0.2:1 to 10:1 and preferably from 0.8:1 to 5:1. The reaction between imine and oxygen, or gas containing oxygen, may be effected in the absence of contact materials, or use may be made of materials acting as catalysts.

Unrestrictive examples of catalysts employable according to the inventive process are the ones usually employed as cyclization or oxidation catalysts such as silica, alumina, silica-alumina, silica-aluminates, oxides and oxide mixtures of alkaline or earth-alkaline metals, oxides, or oxide mixtures, or compounds of metals belonging to the 3rd, 4th, 5th, 6th, 7th and 8th groups of the periodic system, for example, oxides, or oxide mixtures, or compounds of La, Ce, Ti, Sn, V, P, Sb, Bi, Cr, Mo, W, Te, Mn, Fe, Co, Ni, Pt, Pd and so on, each of them being employed as such or mixed with some other ones.

A particularly preferred fulfillment of the present invention consists in the reaction between an imine and molecular oxygen or gas containing oxygen, it being carried out in the vapor phase at high temperature in the presence of a catalyst fundamentally constituted by active silica. The active silica may be obtained by means of any method known to those skilled in the art and may be employed in any reactor, with a fixed, moving or fluid bed.

The reaction according to the inventive process is carried out in the vapor phase at high temperature, ranging from 300 to 800° C. A preferred range is the one from 450 to 650° C. The pressure may widely range from a few mm. Hg to 10 atmospheres, the reaction being preferably carried out, however, at atmospheric pressure. The apparent contact time between reactants and catalyst is selected from the range from 0.1 to 20 seconds, particularly from 0.5 to 5 seconds. As contact time we mean the ratio between the volume of the reactor wherein the reaction is carried out and the flow of the reactants as gas under the reaction conditions.

The following unrestrictive examples show some of the possible utilizations of the inventive process when preparing heterocyclic compounds containing nitrogen which are important from an industrial point of view. In the examples the conversion, selectivity and yield are to be understood as follows:

$$\text{Conversion} = \frac{\text{Moles of reacted imine}}{\text{Moles of fed imine}} \cdot 100$$

$$\text{Selectivity} = \frac{\text{Moles of obtained heterocyclic compound}}{\text{Moles of reacted imine}} \cdot 100$$

$$\text{Yield} = \frac{\text{Moles of obtained heterocyclic compound}}{\text{Moles of fed imine}} \cdot 100$$

EXAMPLE 1

450 cc. of silica were charged in a stainless steel reactor having a  internal diameter; the silica was prepared starting from a sol of colloidal silica, at 30% $SiO_2$, stabilized with $NH_3$ (silica "Ludox" A.S.), by atomization and extrusion into cylindrical tablets having a 4 mm. diameter, which were then calcined at 500° C. The reactor was fed with N-cyclohexylidenaniline, air and water at 1:1:50 molar ratio, at atmospheric pressure and a temperature of 575° C. The contact time was 1 second.

A 55% conversion was obtained with a 27% selectivity to carbazole, the by-products being constituted of diphenylamine (46% selectivity) and 1,2,3,4-tetrahydrocarbazole (4% selectivity).

The test was repeated at 620° C.; a 61% conversion and a 34% selectivity to carbazole were obtained, while the selectivity to diphenylamine and 1,2,3,4-tetrahydrocarbazole were 40% and 7%.

EXAMPLE 2

By making use of the same reactor and of the same catalyst as in the preceding example, a feed was performed consisting of N-isopropylidencyclohexylamine, air and water at an 1:8:90 ratio, at atmospheric pressure, a temperature of 540° C. and a contact time of 1 second. The obtained product was 2-methylindole together with low amounts of indole.

EXAMPLE 3

N-cyclohexylidenisopropylamine, air and water, at a molar ratio of 1:8:90, were fed to the same reactor and the same catalyst as in the preceding example, the pressure being the atmospheric one and the temperature 540° C. The contact time was 1 second. Products were obtained consisting of indole and 2-methyl-indole at good yields.

What we claim is:
1. An oxidative dehydrocyclization process which comprises reacting oxygen or an oxygen containing gas with an organic compound selected from the group consisting of N-cyclohexylidenaniline, N-ethylidenecyclohexylamine, N-cyclohexylidenethylamine, N-cyclohexylideneisopropylamine, N-isopropylidenecyclohexylamine, N-cyclohexylidenecyclohexylamine, N-benzalcyclohexylamine, N-cyclohexylidenepropylamine and N-cyclohexyliden-o-toluidine in the presence of an activated silica catalyst and steam.

2. A process according to claim 1 wherein the reaction is carried out at a temperature ranging from 450–650° C.

3. A process according to claim 1 wherein the reaction is carried out at a temperature ranging from 300° C. to 800° C.

4. A process according to claim 1 wherein the reaction is carried out at a pressure ranging from a few mm. Hg to 10 atmospheres.

5. A process according to claim 1 wherein use is made of a mixture of oxygen or a gas containing oxygen and the organic compound at an oxygen/organic compound molar ratio ranging from 0.2:1 to 10:1 and preferably from 0.8:1 to 5:1.

6. A process according to claim 1 wherein the gas containing oxygen is air.

7. A process according to claim 1 wherein the apparent contact time between reactants and catalyst ranges from 0.1 to 20 seconds.

References Cited

UNITED STATES PATENTS 3,463,781  8/1969  Bell et al. _____ 260—283 SY

OTHER REFERENCES

JACS 73: 704–706 (1951) Hansch et al.
JACS 74: 4554–4555 (1952) Hansch et al.

HENRY R. JILES, Primary Examiner

S. D. WINTERS, Assistant Examiner

U.S. Cl. X.R.

260—283 SY, 315, 319.1, 290 R, 566 R